United States Patent
Koyama et al.

(10) Patent No.: US 9,435,696 B2
(45) Date of Patent: Sep. 6, 2016

(54) TEMPERATURE SENSOR CIRCUIT AND SEMICONDUCTOR DEVICE INCLUDING TEMPERATURE SENSOR CIRCUIT

(71) Applicant: Semiconductor Energy Laboratory Co., Ltd., Atsugi-shi, Kanagawa-ken (JP)

(72) Inventors: Jun Koyama, Sagamihara (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 588 days.

(21) Appl. No.: 13/873,550

(22) Filed: Apr. 30, 2013

(65) Prior Publication Data

US 2013/0294481 A1 Nov. 7, 2013

(30) Foreign Application Priority Data

May 2, 2012 (JP) .................. 2012-105460

(51) Int. Cl.
*G01K 7/01* (2006.01)
(52) U.S. Cl.
CPC ..................... *G01K 7/01* (2013.01)
(58) Field of Classification Search
CPC .................................................. G01K 7/01
USPC ........................................................ 374/163
See application file for complete search history.

(56) References Cited

U.S. PATENT DOCUMENTS

| | | | |
|---|---|---|---|
| 4,102,199 A * | 7/1978 | Tsipouras | G01K 1/026 374/167 |
| 5,731,856 A | 3/1998 | Kim et al. | |
| 5,744,864 A | 4/1998 | Cillessen et al. | |
| 5,796,290 A * | 8/1998 | Takahashi | G01K 7/01 307/651 |
| 6,294,274 B1 | 9/2001 | Kawazoe et al. | |
| 6,563,174 B2 | 5/2003 | Kawasaki et al. | |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.

(Continued)

*Primary Examiner* — Lisa Caputo
*Assistant Examiner* — Philip Cotey
(74) *Attorney, Agent, or Firm* — Robinson Intellectual Property Law Office; Eric J. Robinson

(57) ABSTRACT

To provide a highly accurate temperature sensor circuit. The temperature sensor circuit includes a first constant current circuit; a first diode in which a first voltage reflecting the temperature of an object to be detected is generated between an anode and a cathode in accordance with a first current supplied from the first constant current circuit; a second constant current circuit; a second diode which includes an oxide semiconductor and in which a second voltage is generated between an anode and a cathode in accordance with a second current supplied from the second constant current circuit; and an amplifier circuit which amplifies a difference between the first voltage and the second voltage.

10 Claims, 11 Drawing Sheets

(56) References Cited

U.S. PATENT DOCUMENTS

| | | | |
|---|---|---|---|
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,199,520 B2 | 4/2007 | Fujii et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,333,910 B2 | 2/2008 | Ishii |
| 7,350,974 B2 | 4/2008 | Mikuni et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,813 B2 | 12/2008 | Hirose et al. |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,540,657 B2 | 6/2009 | Mikuni et al. |
| 7,674,650 B2 | 3/2010 | Akimoto et al. |
| 7,732,819 B2 | 6/2010 | Akimoto et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0004992 A1* | 1/2004 | Aota | G01K 7/01 374/163 |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0156838 A1 | 7/2005 | Miyagawa et al. |
| 2005/0199959 A1 | 9/2005 | Chiang et al. |
| 2005/0220171 A1* | 10/2005 | Faour | G01K 7/01 374/178 |
| 2005/0264971 A1* | 12/2005 | Morino | G01K 3/005 374/E7.035 |
| 2006/0022206 A1 | 2/2006 | Hayakawa et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2007/0290984 A1* | 12/2007 | Yang | G09G 3/3696 345/101 |
| 2008/0001070 A1* | 1/2008 | Nakamura | G01J 1/02 250/214 R |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0149624 A1 | 6/2008 | Tamura |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0246903 A1* | 10/2008 | Park | G01K 13/00 349/72 |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0009107 A1 | 1/2009 | Nomura et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0146725 A1* | 6/2009 | Kimura | G01K 1/026 327/512 |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0133182 A1 | 6/2011 | Saito et al. |
| 2011/0205209 A1 | 8/2011 | Kurokawa et al. |
| 2011/0205258 A1* | 8/2011 | Suminoe | G09G 3/3406 345/690 |
| 2013/0181854 A1 | 7/2013 | Koyama et al. |
| 2013/0235689 A1 | 9/2013 | Koyama |
| 2013/0279537 A1* | 10/2013 | Tang | G01K 7/32 374/141 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2011-007545 | 1/2011 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

(56) References Cited

OTHER PUBLICATIONS

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor,", IDW'08 : Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the $In_2O_3$—$Ga_2ZnO_4$—$ZnO$ system at 1350°C.,", Journal of Solid State Chemistry, Aug. 1, 1991, vol. 93, No. 2, pp. 298-315.

Kimizuka.N et al., "Syntheses and Single-Crystal Data of Homologous Compounds, $In_2O_3(ZnO)_m$ (m= 3, 4, and 5), and $InGaO_3(ZnO)_3$, and $Ga_2O_3(ZnO)_m$ (m=7, 8, 9, and 16) in the $In_2O_3$—$ZnGa_2O_4$—$ZnO$ System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn—Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline $InGaO_3(ZnO)_5$ films,", Appl. Phys. Lett. (Applied Physics Letters), Sep. 13, 2004, vol. 85, No. 11, pp. 1993-1995.

Li.C et al., "Modulated Structures of Homologous Compounds $InMO_3(ZnO)_m$ (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO ($Ga_2O_3$—$In_2O_3$—$ZnO$) TFT,", SID Digest '08 : SID International Symposium Digest of Technical Papers, May 20, 2008, vol. 39, pp. 633-636.

Lee.J et al., "World'S Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing $MoO_3$ as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of The 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 277-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, PP. 115-116.

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-in. AMOLED Display With Driver Circuit Using Amorphous In—Ga—Zn—Oxide TFTs,", IDW'09 : Proceedings of the 16th International Display Workshops, 2009, pp. 689-692.

Park.J et al., "Amorphous Indium—Gallium—Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by Peald Grown ZnO TFT,", IMID '07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDs,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digset of Technical Papers, May 31, 2009, pp. 1110-1112.

Ohara.H et al., "21.3:4.0 in. QVGA AMOLED Display Using In—Ga—Zn—Oxide TFTs With a Novel Passivation Layer,", SID Digest '09 : SID International Symposium Digest of Technical Papers, May 31, 2009, pp. 284-287.

Miyasaka.M, "Suftla Flexible Microelectronics on Their Way to Business,", SID Digest '07 : SID International Symposium Digest of Technical Papers, 2007, vol. 38, pp. 1673-1676.

(56) References Cited

OTHER PUBLICATIONS

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal, Composites for Display Applications,", SID Digest '09 : SID International Symposium Digest of Techincal Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YBFE2O4, and YB2FE3O7 Types of Structures for Compounds in the IN2O3 and SC2O3—A2O3—BO Systems [A; Fe, Ga, or Al; B: Mg, Mn, Fe, Ni, Cu, Or, Zn] At Temperatures Over 1000°C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B. (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

* cited by examiner

TEMPERATURE SENSOR CIRCUIT AND SEMICONDUCTOR DEVICE INCLUDING TEMPERATURE SENSOR CIRCUIT

BACKGROUND OF THE INVENTION

1. Field of the Invention

An embodiment of the present invention relates to a temperature sensor circuit including a semiconductor element and a semiconductor device including the temperature sensor circuit.

2. Description of the Related Art

A temperature sensor circuit includes a sensor which converts temperature data into an electric signal (sensor signal) and circuits for processing the sensor signal output from the sensor. In the case where a temperature sensor circuit is formed in a semiconductor integrated circuit, not a resistance thermometer bulb, a thermistor, a thermocouple, or the like but a sensor utilizing the influence of temperature of a diode is generally used.

Specifically, in the case of a temperature sensor circuit including a diode as a sensor, with the diode where a proportion of variations in electrical characteristics depending on the temperature (i.e., the proportion is influence of temperature and the proportion is also called temperature dependence) is large, temperature data of an object to be detected can be obtained using a forward voltage generated when a forward current is constant or a forward current when a forward voltage is constant. For example, a forward voltage generated when a constant forward current flows from a constant current source to the diode is lower when the temperature of the diode is higher, and is higher when the temperature of the diode is lower. Thus, the forward voltage of the diode depends on the temperature of the diode.

Patent Document 1 below discloses a temperature sensor including a resistor serving as a current control element and a diode serving as a sensor element; the resistor and the diode are connected between a power source VDD and ground GND.

REFERENCE

[Patent Document 1] Japanese Published Patent Application No. 2011-007545

SUMMARY OF THE INVENTION

In the case of the temperature sensor circuit having the above configuration, even when temperature is constant, measurement value varies unless a current or a voltage supplied to the diode is kept constant. When a too high current flows to the diode, the diode generates heat, which causes a difference in the temperature between an object to be detected and the diode. For this reason, the temperature sensor circuit having the above configuration needs to be provided with a constant current circuit or a constant voltage circuit so that a low current of approximately several μA to several hundred μA which is kept constant can be supplied to the diode to measure the temperature of an object to be detected with high accuracy.

However, a constant current circuit or a constant voltage circuit generally includes a transistor including silicon in a channel formation region. In a transistor including silicon in a channel formation region, as the temperature increases, the drain current increases due to a shift in threshold voltage. Thus, when the temperature of a temperature sensor circuit is higher, a current which is output from a constant current circuit or a voltage output from a constant voltage circuit is more likely to vary due to a fluctuation in the threshold voltage of the transistor. When the electrical characteristics of the transistor included in the constant current circuit or the constant voltage circuit vary, the current or voltage thereof also varies. The forward voltage or forward current of a diode is influenced by a small fluctuation in supplied current or voltage; therefore, a fluctuation in current output from the constant current circuit or voltage output from the constant voltage circuit makes it difficult to measure the temperature of an object to be detected with high accuracy.

In view of the above technical background, an object of one embodiment of the present invention is to provide a highly accurate temperature sensor circuit. Another object of one embodiment of the present invention is to provide a semiconductor device in which accurate temperature data obtained with the use of the temperature sensor circuit can be utilized for the operation.

In one embodiment of the present invention, a temperature sensor circuit includes a first semiconductor element for obtaining temperature data and a second semiconductor element receiving a small influence of temperature. In another embodiment of the present invention, the second semiconductor element includes an oxide semiconductor. A semiconductor element including an oxide semiconductor receives a smaller influence of temperature of a voltage generated between terminals than a transistor including a normal semiconductor such as silicon or germanium in a channel formation region. Thus, the voltage between terminals of the second semiconductor element is less likely to be affected by the temperature of an object to be detected.

A voltage or a current generated between terminals of the first semiconductor element by supply of a current or a voltage is compared with a voltage or a current generated between terminals of the second semiconductor element by supply of a current or a voltage, whereby temperature data of an object to be detected is obtained.

In another embodiment of the present invention, with the above configuration, a factor which affects a voltage generated between terminals of the first semiconductor element and which is other than the temperature of an object to be detected can be prevented from influencing a measurement value, so that more accurate data of the temperature of the detected object can be obtained; the factor is, for example, a variation with temperature in a current supplied from the constant current circuit or a voltage supplied from the constant voltage circuit, or variations in the electrical characteristics of the transistor included in the constant current circuit or the constant voltage circuit.

According to one embodiment of the present invention, a highly accurate temperature sensor circuit can be provided. According to another embodiment of the present invention, a semiconductor device in which accurate temperature data obtained with the use of the temperature sensor circuit can be utilized for the operation.

DETAILED DESCRIPTION OF THE INVENTION

Hereinafter, embodiments of the present invention will be described in detail with reference to the accompanying drawings. Note that the present invention is not limited to the following description and it is easily understood by those skilled in the art that the mode and details can be variously changed without departing from the scope and spirit of the present invention. Accordingly, the invention should not be construed as being limited to the description of the embodiments below.

Note that a temperature sensor circuit of one embodiment of the present invention can be employed for a wide variety of semiconductor devices such as integrated circuits, RF tags, and semiconductor display devices. The semiconductor devices including temperature sensor circuits are included in the category of the present invention. The integrated circuits include, in the category, large scale integrated circuits (LSIs) including a microprocessor, an image processing circuit, a digital signal processor (DSP), and a microcontroller and programmable logic devices (PLDs) such as a field programmable gate array (FPGA) and a complex PLD (CPLD). The semiconductor display devices include, in the category, liquid crystal display devices, light-emitting devices having pixels each provided with a light-emitting element typified by an organic light-emitting element (OLED), electronic paper, digital micromirror devices (DMDs), plasma display panels (PDPs), and field emission displays (FEDs).

(Embodiment 1)

Figure 1:
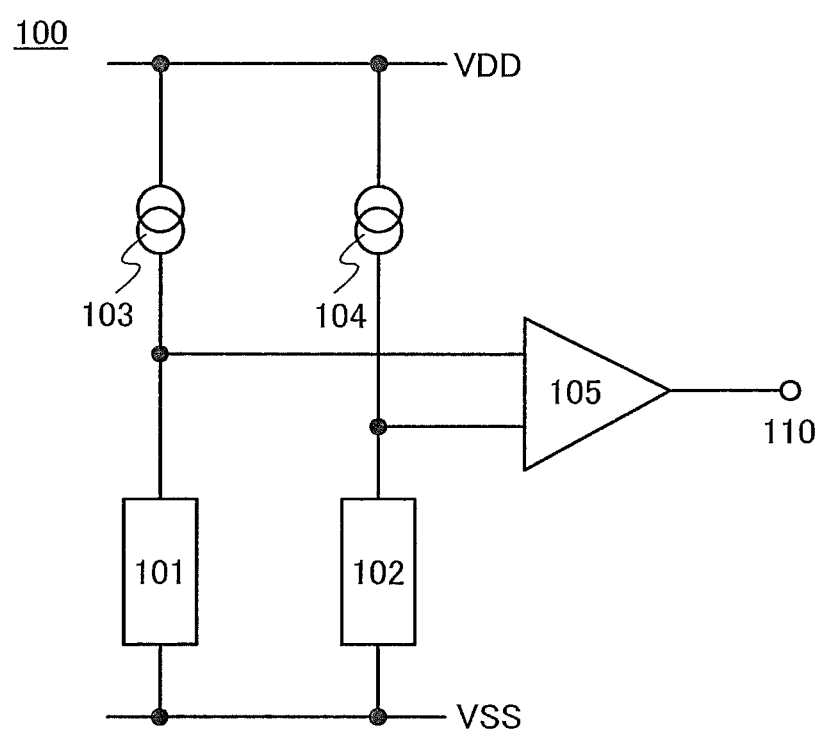
FIG. 1 illustrates the configuration of a temperature sensor circuit.

FIG. 1 illustrates a configuration example of a temperature sensor circuit of one embodiment of the present invention. The temperature sensor circuit 100 in FIG. 1 includes a semiconductor element 101, a semiconductor element 102, a constant current circuit 103, a constant current circuit 104, and an amplifier circuit 105.

The semiconductor element 101 includes an oxide semiconductor and is serially connected to the constant current circuit 103 between a node supplied with a low-level potential VSS and a node supplied with a high-level potential VDD. Specifically, a first terminal of the semiconductor element 101 is connected to the node supplied with the potential VSS, and the constant current circuit 103 is connected between the second terminal of the semiconductor element 101 and the node supplied with the potential VDD.

The semiconductor element 102 includes a semiconductor where the influence of temperature is larger than that of an oxide semiconductor, such as single crystal silicon, polycrystalline silicon, microcrystalline silicon, or amorphous silicon; however, one embodiment of the present invention is not limited thereto. The semiconductor element 102 and the constant current circuit 104 are connected in series between the node supplied with the potential VSS and the node supplied with the potential VDD. Specifically, a first terminal of the semiconductor element 102 is connected to the node supplied with the potential VSS, and the constant current circuit 104 is connected between a second terminal of the semiconductor element 102 and the node supplied with the potential VDD.

Note that FIG. 1 illustrates the case where the semiconductor element 101 and the constant current circuit 103 are connected in series and the semiconductor element 102 and the constant current circuit 104 are connected in series, between the node supplied with the potential VSS and the node supplied with the potential VDD. However, the semiconductor element 101 and the constant current circuit 103 may be connected in series between a node supplied with a low-level potential VSS1 and a node supplied with a high-level potential VDD1 and the semiconductor element 102 and the constant current circuit 104 may be connected in series between a node supplied with a low-level potential VSS2 different from the potential VSS1 and a node supplied with a high-level potential VDD2 different from the potential VDD1.

A voltage generated between the first terminal and the second terminal of the semiconductor element 101 when a predetermined forward current $I_{101}$ flows from the constant current circuit 103 to the semiconductor element 101 is a forward voltage $V_{101}$. The semiconductor element 101 includes an oxide semiconductor and thus receives a small influence of temperature. For this reason, the forward voltage $V_{101}$ is less likely to be influenced by the temperature of the semiconductor element 101, that is, the forward voltage $V_{101}$ is less likely to reflect the temperature of the semiconductor element 101.

A voltage generated between the first terminal and the second terminal of the semiconductor element 102 when a predetermined forward current $I_{102}$ flows from the constant current circuit 104 to the semiconductor element 102 is a forward voltage $V_{102}$. The semiconductor element 102 receives a larger influence of temperature than the semiconductor element 101. Thus, the higher the temperature of the semiconductor element 102, the lower the forward voltage $V_{102}$. Specifically, in the case of the semiconductor element 102 including silicon, the forward voltage $V_{102}$ varies at a rate of approximately −2 mV/° C. Thus, the forward voltage V102 reflects the temperature of an object to be detected.

The amplifier circuit 105 has a function of amplifying a voltage difference between the forward voltage $V_{101}$ and the forward voltage $V_{102}$ and outputting the amplified voltage difference as a voltage Vout from an output terminal 110 of the amplifier circuit 105. Specifically, in the temperature sensor circuit 100 illustrated in FIG. 1, the potential of the second terminal of the semiconductor element 101 obtained by adding the forward voltage $V_{101}$ to the potential VSS and the potential of the second terminal of the semiconductor element 102 obtained by adding the forward voltage $V_{102}$ to the potential VSS are supplied to the amplifier circuit 105. As the amplifier circuit 105, a differential amplifier circuit can be used, for example.

Note that the forward voltage $V_{102}$ contains, as data, a variation with temperature in the forward current $I_{102}$ supplied from the constant current circuit 104, variations in electrical characteristics of a transistor included in the constant current circuit 104, and the like besides the temperature of the semiconductor element 102. The forward voltage $V_{101}$ presumably does not contain data of the temperature of the semiconductor element 101 but contains a variation with temperature in the forward current $I_{101}$ supplied from the constant current circuit 103, variations in the electrical characteristics of a transistor included in the constant current circuit 103, and the like as data. Thus, assuming that there is no difference in influence of temperature, the electrical characteristics of the transistors, and the like between the constant current circuit 103 and the constant current circuit 104, the differences between the constant current circuit 103 and the constant current circuit 104 in influence of temperature, the electrical characteristics of the transistors, and the like are canceled in the voltage Vout obtained when the amplifier circuit 105 amplifies the voltage difference between the forward voltage $V_{101}$ and the forward voltage $V_{102}$. Thus, in the temperature sensor circuit 100 of one embodiment of the present invention, a factor which affects the forward voltage $V_{102}$ of the semiconductor element 102 and which is other than the temperature of an object to be detected can be prevented from influencing a measurement value the voltage Vout, so that more accurate data of the temperature of the detected object can be obtained; the factor is, for example, a variation with temperature in a current supplied from the constant current circuit 104 to the semiconductor element 102 or variations in the electrical characteristics of the transistor included in the constant current circuit 104.

Note that the forward current $I_{101}$ supplied to the semiconductor element 101 does not necessarily have to be equal to the forward current $I_{102}$ supplied to the semiconductor element 102. However, when the forward current $I_{101}$ is equal to or substantially equal to the forward current $I_{102}$, differences between the constant current circuit 103 and the constant current circuit 104 in influence of temperature, the electrical characteristics of the transistors, and the like can be cancelled more accurately.

Figure 2A:
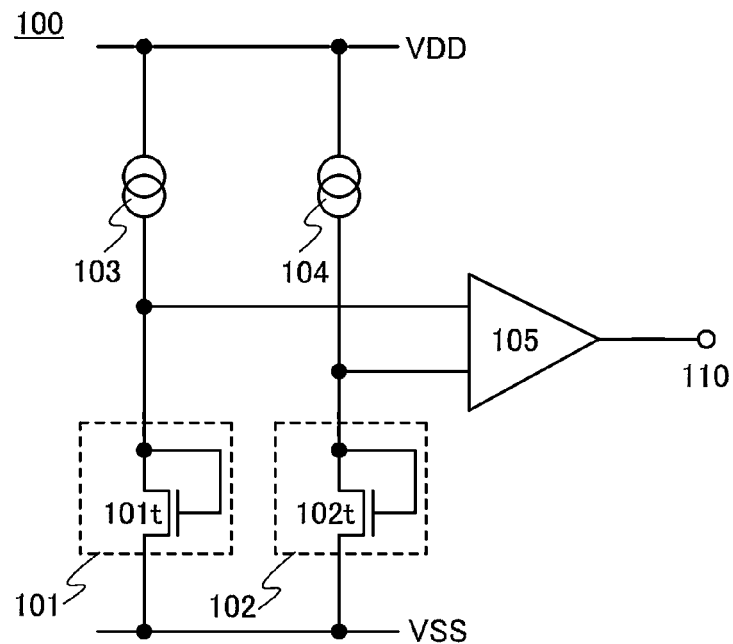
FIG. 2A illustrates the configuration of a temperature sensor circuit.

Next, FIG. 2A illustrates a specific configuration example of the temperature sensor circuit 100 in FIG. 1.

In the temperature sensor circuit 100 in FIG. 2A, a transistor 101t is used as the semiconductor element 101 and a transistor 102t is used as the semiconductor element 102. Specifically, one of a source terminal and a drain terminal of the transistor 101t is connected to a node supplied with the potential VSS, and a gate electrode and the other of the source terminal and the drain terminal of the transistor 101t are connected to the constant current circuit 103. The potential of the other of the source terminal and the drain terminal of the transistor 101t and the potential of the gate electrode of the transistor 101t are supplied to the amplifier circuit 105. One of a source terminal and a drain terminal of the transistor 102t is connected to the node supplied with the potential VSS, and a gate electrode and the other of the source terminal and the drain terminal of the transistor 102t are connected to the constant current circuit 104. The potential of the other of the source terminal and the drain terminal of the transistor 102t and the potential of the gate electrode of the transistor 102t are supplied to the amplifier circuit 105.

Note that the temperature sensor circuit 100 may further include another circuit element such as a transistor, a diode, a resistor, or an inductor as needed.

Note that "source terminal" of a transistor in this specification refers to a source region that is part of a semiconductor film functioning as an active layer or a source electrode connected to the semiconductor film. Similarly, "drain terminal" of a transistor in this specification refers to a drain region which is part of a semiconductor film functioning as an active layer or a drain electrode connected to the semiconductor film.

Note that the terms "source terminal" and "drain terminal" of a transistor are interchanged depending on the type of the channel of the transistor or the levels of potentials supplied to the source terminal and the drain terminal. In general, as for a source terminal and a drain terminal of an n-channel transistor, one to which a lower potential is supplied is called a source terminal, and one to which a higher potential is supplied is called a drain terminal. Further, as for a source terminal and a drain terminal of a p-channel transistor, one to which a lower potential is supplied is called a drain terminal, and one to which a higher potential is supplied is called a source terminal. In this specification, although the connection relation of the transistor may be described assuming that the source terminal and the drain terminal are fixed for convenience, actually, the names of the source terminal and the drain terminal are interchanged depending on the relation of the potentials.

In the transistor 101t, an oxide semiconductor is used for an active layer. In the transistor 102t, a semiconductor receiving a larger influence of temperature than the oxide semiconductor is used for an active layer.

Figure 2B:
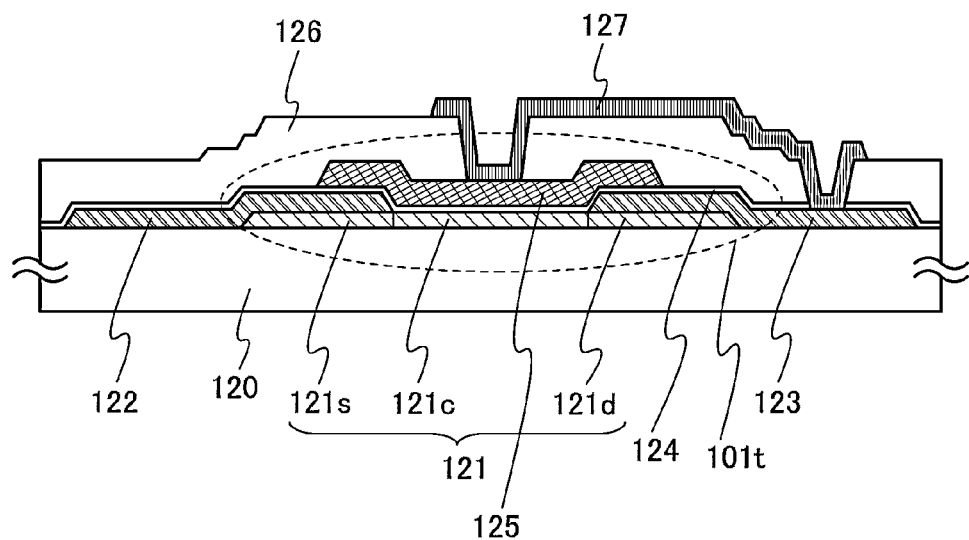
FIG. 2B is a cross-sectional view of a transistor.

FIG. 2B illustrates an example of a cross-sectional structure of the transistor 101t. The transistor 101t in FIG. 2B includes, over a substrate 120 having an insulating surface, a semiconductor film 121 serving as an active layer, a source electrode 122 and a drain electrode 123 over the semiconductor film 121, a gate insulating film 124 over the semiconductor film 121, the source electrode 122, and the drain electrode 123, and a gate electrode 125 which is over the gate insulating film 124 and between the source electrode 122 and the drain electrode 123 and overlaps with the semiconductor film 121.

Further, an insulating film 126 is provided over the transistor 101t, and a conductive film 127 connected to the gate electrode 125 and the drain electrode 123 through an opening formed in the gate insulating film 124 and the insulating film 126 is provided over the insulating film 126.

In the transistor 101t illustrated in FIG. 2B, a region of the semiconductor film 121 which is between the source electrode 122 and the drain electrode 123 and overlaps with the gate electrode 125 corresponds to a channel formation region 121c. A region of the semiconductor film 121 which overlaps with the source electrode 122 corresponds to a source region 121s, and a region of the semiconductor film 121 which overlaps with a drain electrode 123 corresponds to a drain region 121d.

In one embodiment of the present invention, the oxide semiconductor needs to be included in at least the channel formation region 121c of the semiconductor film 121; however, the oxide semiconductor may be included in the whole of the semiconductor film 121.

Next, the values of drain current Id versus gate voltage Vg of a transistor where an oxide semiconductor film was used for an active layer and a transistor where a single crystal silicon film was used for an active layer will be described; the values were measured while temperature was changed. Note that the gate voltage Vg refers to the voltage of a gate electrode, using the potential of a source electrode as a reference potential.

The measurement was performed under the conditions that a drain voltage Vd is 0.1 V and the gate voltage Vg is in the range from −3 V to +3 V. Note that the drain voltage Vd refers to the voltage of a drain electrode, using the potential of the source electrode as a reference potential. In the measurement, the substrate temperature was set to −40° C., −25° C., 25° C., 85° C., 125° C., and 150° C.

Figure 10A:
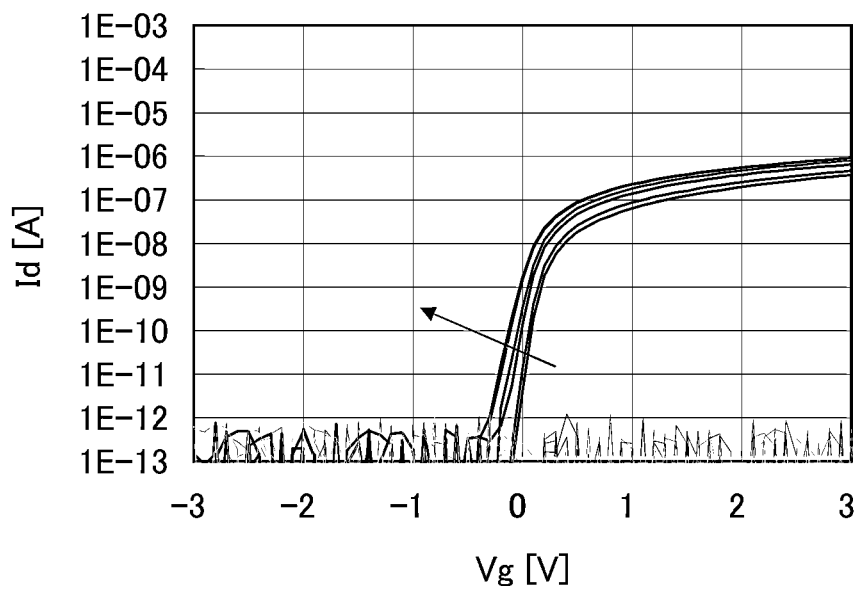
FIGS. 10A and 10B are each a graph showing the measured values of drain current versus gate voltage.

FIG. 10A is a graph showing the relation between gate voltage Vg and drain current Id at different substrate temperatures of a transistor (OSFET) where an oxide semiconductor film was used for an active layer. In the OSFET used in the measurement, an In—Ga—Zn-based oxide semiconductor was used for the active layer, the channel length was 10 nm, the channel width was 10 nm, the relative dielectric constant was 4.1, and the thickness of a gate insulating film was 20 nm.

Figure 10B:
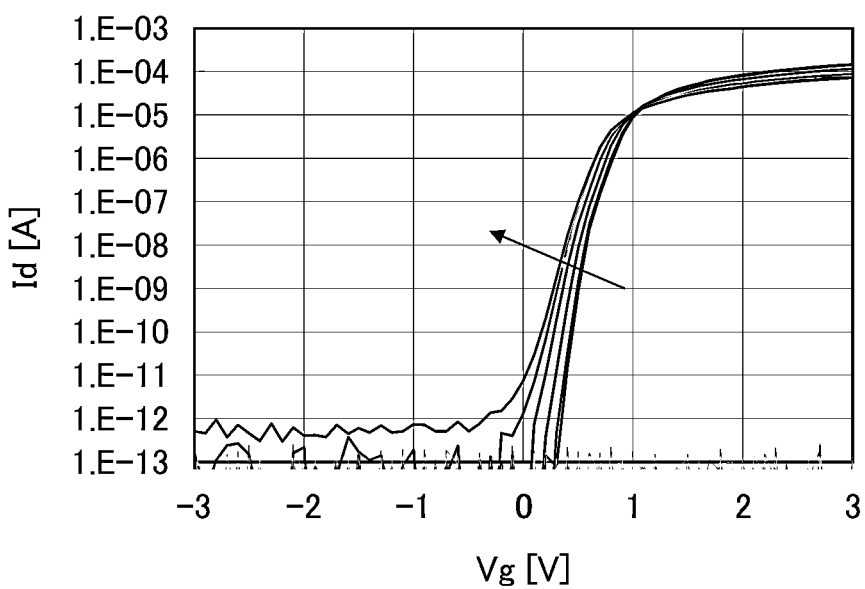

FIG. 10B is a graph showing the relation between gate voltage Vg and drain current Id at different substrate temperatures of a transistor (SiFET) where a single crystal silicon film was used for an active layer. The SiFET used in the measurement was an n-channel transistor where the channel length was 1.5 nm, the channel width was 20 nm, the relative dielectric constant was 4.1, and the thickness of a gate insulating film was 20 nm.

In FIGS. 10A and 10B, drain current Id versus gate voltage Vg is higher at a higher substrate temperature as shown by an arrow, that is, in the following order: 150° C., 125° C., 85° C., 25° C., −25° C., −40° C. However, FIGS. 10A and 10B show that the subthreshold swing of the SiFET is larger and a variation in the shift value of the SiFET is greater at a higher substrate temperature than those of the OSFET. Note that a shift value is the value of the gate voltage Vg at a drain current Id of $10^{-12}$ A. It is also found that a variation in the drain current Id of the OSFET with temperature is smaller as the gate voltage Vg in an on state is closer to the threshold voltage as compared with the case of the SiFET.

Figure 11A:
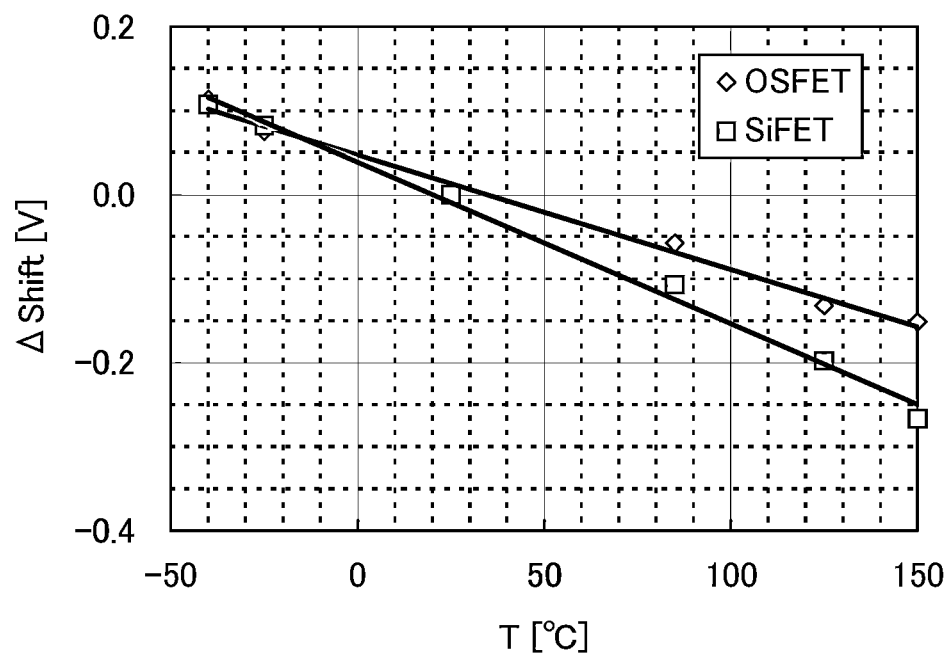
FIG. 11A is a graph showing variations in shift values versus substrate temperature and 11B is a graph showing variations in subthreshold swings versus substrate temperature.

FIG. 11A shows variations in shift values versus substrate temperature of the OSFET and the SiFET, using the shift value at a substrate temperature of 25° C. as a reference value. FIG. 11A shows that a variation in the shift value of the OSFET with temperature is smaller than that of the SiFET.

Figure 11B:
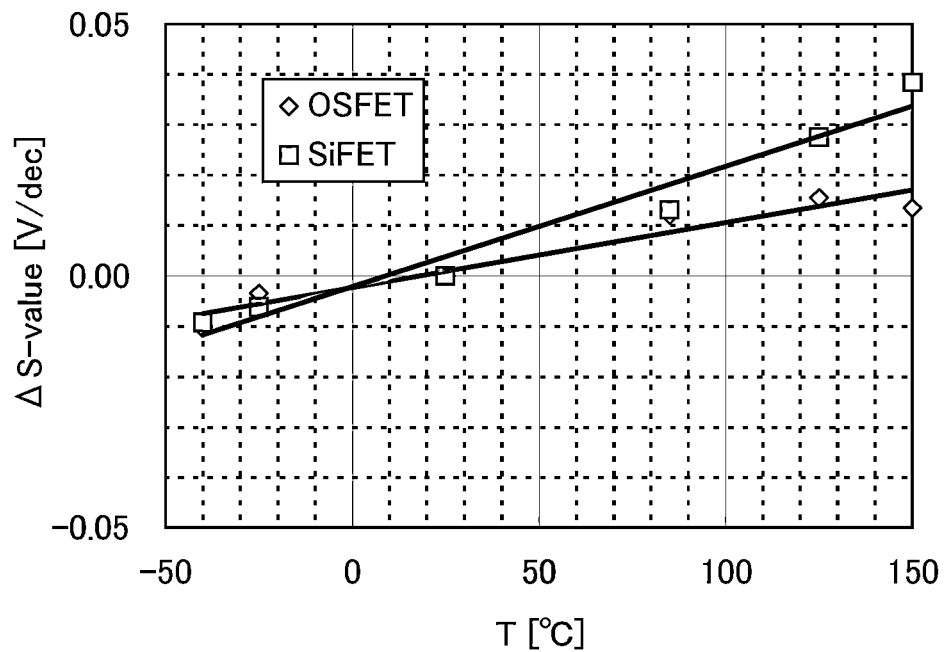

FIG. 11B shows variations of subthreshold values versus substrate temperature of the OSFET and the SiFET, using the subthreshold value at a substrate temperature of 25° C. as a reference value. FIG. 11B shows that a variation of the subthreshold value of the OSFET with temperature is smaller than that of the SiFET.

As seen from the example of the transistor 101$t$, the drain current of a transistor including an oxide semiconductor in a channel formation region receives an extremely small influence of temperature. Accordingly, the use of the transistor including an oxide semiconductor in a channel formation region as the semiconductor element 101 in FIG. 1 or FIG. 2A makes it possible to obtain accurate temperature data of an object to be detected.

Note that an oxide semiconductor preferably contains at least indium (In) or zinc (Zn). The oxide semiconductor preferably contains, in addition to In and Zn, gallium (Ga) serving as a stabilizer that reduces variations in electrical characteristics of a transistor including the oxide semiconductor. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

As another stabilizer, one or more lanthanoids such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained.

As the oxide semiconductor, for example, any of the following can be used: an indium oxide; a gallium oxide, a tin oxide; a zinc oxide; two-component metal oxides such as an In—Zn-based oxide, a Sn—Zn-based oxide, an Al—Zn-based oxide, a Zn—Mg-based oxide, a Sn—Mg-based oxide, an In—Mg-based oxide, and an In—Ga-based oxide; three-component metal oxides such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, and an In—Lu—Zn-based oxide; and a four-component metal oxides such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that, as an example, an In—Ga—Zn-based oxide refers to an oxide containing In, Ga, and Zn, and there is no limitation on the ratio of In, Ga, and Zn. Further, the In—Ga—Zn-based oxide may contain a metal element other than In, Ga, and Zn. The In—Ga—Zn-based oxide has sufficiently high resistance when no electric field is applied thereto, so that the off-state current can be sufficiently reduced. Further, the In—Ga—Zn-based oxide has high mobility.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios may be used.

For example, with an In—Sn—Zn-based oxide, high mobility can be obtained relatively easily. However, even with an In—Ga—Zn-based oxide, mobility can be increased by reducing the defect density in the bulk.

The use of an In—Ga—Zn-based oxide or an In—Sn—Zn-based oxide among oxide semiconductors has the following advantages: transistors having excellent electrical characteristics can be formed by a sputtering method or a wet process and thus can be mass-produced easily. Further, the oxide semiconductor an In—Ga—Zn-based oxide can be deposited even at room temperature; thus, transistors with excellent electrical characteristics can be formed over a glass substrate or an integrated circuit including silicon. Further, a larger substrate can be used.

A structure of an oxide semiconductor film is described below.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example thereof is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of each crystal part fits inside a cube whose one side is less than 100 nm. Thus, there is a case where a crystal part included in the CAAC-OS film fits a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

In this specification, a term "parallel" indicates that the angle formed between two straight lines is greater than or equal to −10° and less than or equal to 10°, and accordingly also includes the case where the angle is greater than or equal to −5° and less than or equal to 5°. In addition, a term "perpendicular" indicates that the angle formed between two straight lines is greater than or equal to 80° and less than or equal to 100°, and accordingly includes the case where the angle is greater than or equal to 85° and less than or equal to 95°.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned with a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depends on regions.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° is derived from the (311) plane of a $ZnGa_2O_4$ crystal; such a peak indicates that a $ZnGa_2O_4$ crystal is included in part of the CAAC-OS film including the $InGaZnO_4$ crystal. It is preferable that in the CAAC-OS film, a peak of 2θ appear at around 31° and a peak of 2θ do not appear at around 36°.

In a transistor using the CAAC-OS film, change in electric characteristics due to irradiation with visible light or ultraviolet light is small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

For example, the CAAC-OS film is formed by a sputtering method with a polycrystalline metal oxide target. When ions collide with the target, a crystal region included in the target may be separated from the target along an a-b plane; in other words, a sputtered particle having a plane parallel to an a-b plane (flat-plate-like sputtered particle or pellet-like sputtered particle) may flake off from the sputtering target. In that case, the flat-plate-like sputtered particle reaches a substrate while maintaining their crystal state, whereby the CAAC-OS film can be formed.

For the deposition of the CAAC-OS film, the following conditions are preferably used.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in a treatment chamber may be reduced. Furthermore, the concentration of impurities in a deposition gas may be reduced. Specifically, a deposition gas whose dew point is −80° C. or lower, preferably −100° C. or lower is used.

By increasing the substrate heating temperature during the deposition, migration of a sputtered particle is likely to occur after the sputtered particle reaches a substrate surface. Specifically, the substrate heating temperature during the deposition is higher than or equal to 100° C. and lower than or equal to 740° C., preferably higher than or equal to 200° C. and lower than or equal to 500° C. When the substrate heating temperature during the deposition is increased and the flat-plate-like sputtered particles reach the substrate, migration occurs over the substrate, and flat surfaces of the sputtered particles are attached to the substrate.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %.

As an example of the target, an In—Ga—Zn-based oxide target will be described below.

The In—Ga—Zn-based oxide target, which is polycrystalline, is made by mixing $InO_X$ powder, $GaO_Y$ powder, and $ZnO_Z$ powder in a predetermined molar ratio, applying pressure, and performing heat treatment at a temperature higher than or equal to 1000° C. and lower than or equal to 1500° C. Note that X, Y, and Z are each a given positive number. Here, the predetermined molar ratio of $InO_X$ powder to $GaO_Y$ powder and $ZnO_Z$ powder is, for example, 2:2:1, 8:4:3, 3:1:1, 1:1:1, 4:2:3, or 3:1:2. The kinds of powder and the molar ratio for mixing powder may be determined as appropriate depending on the desired target.

An alkali metal is not an element included in an oxide semiconductor and thus is an impurity. An alkaline earth metal is also an impurity in the case where alkaline earth metal is not included in an oxide semiconductor. In particular, Na among alkali metals becomes $Na^+$ when an insulating film in contact with the oxide semiconductor film is an oxide and Na diffuses into the insulating film. In addition, in the oxide semiconductor film, Na cuts or enters a bond between a metal and oxygen which are contained in an oxide semiconductor. As a result, for example, degradation of electrical characteristics of a transistor, such as a normally-on state of the transistor due to shift of the threshold voltage in the negative direction or reduction in mobility, occurs. In addition, variations in electrical characteristics also occurs. Specifically, a measurement value of the Na concentration by secondary ion mass spectrometry is preferably less than or equal to $5\times10^{16}/cm^3$, more preferably less than or equal to $1\times10^{16}/cm^3$, still more preferably less than or equal to $1\times10^{15}/cm^3$. In a similar manner, a measurement value of the Li concentration is preferably less than or equal to $5\times10^{15}/cm^3$, more preferably less than or equal to $1\times10^{15}/cm^3$. In a similar manner, a measurement value of the K concentration is preferably less than or equal to $5\times10^{15}/cm^3$, more preferably less than or equal to $1\times10^{15}/cm^3$.

FIG. 2B illustrates an example where the transistor 101t includes one channel formation region 121c corresponding to one gate electrode 125, that is, the transistor 101t has a single-gate structure. However, the transistor 101t may have a multi-gate structure in which a plurality of gate electrodes electrically connected to each other are provided and thus a plurality of channel formation regions are included in one active layer.

The transistor 101t includes a gate electrode at least on one side of the active layer. Alternatively, the transistor 101t may include a pair of gate electrodes with the active layer interposed therebetween. When the transistor has a pair of gate electrodes with the active layer provided therebetween, a signal for controlling switching is input to one of the gate electrodes, and the other of the gate electrodes may be in a floating state (i.e., electrically insulated) or a potential may be supplied to the other of the gate electrodes. In the latter case, the same potentials may be supplied to the pair of electrodes, or a fixed potential such as a ground potential may be supplied only to the other of the gate electrodes. When a potential supplied to the other of the gate electrodes is controlled, the threshold voltage of the transistor 101t can be controlled.

Note that the term "connection" in this specification refers to electrical connection and corresponds to the state in which current, voltage, or a potential can be supplied or transmitted. Accordingly, a connection state means not only a state of direct connection but also a state of indirect connection through a circuit element such as a resistor, a diode, a transistor, or a capacitor so that current, voltage, or a potential can be supplied or transmitted.

Figure 3:
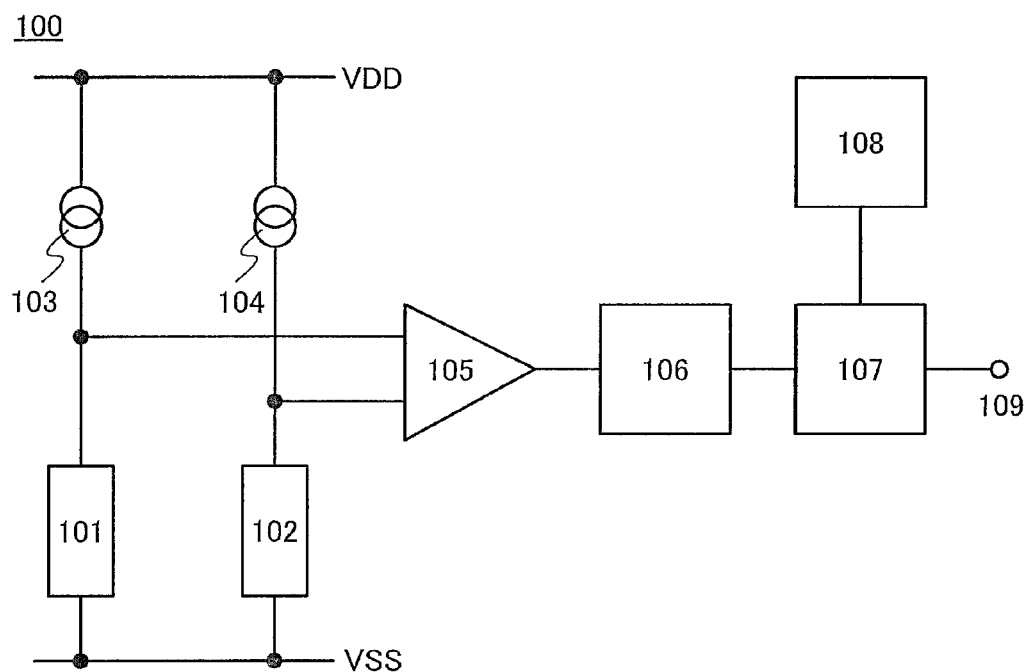
FIG. 3 illustrates the configuration of a temperature sensor circuit.

Next, FIG. 3 illustrates another configuration example of the temperature sensor circuit of one embodiment of the present invention. Like the temperature sensor circuit 100 in FIG. 1, the temperature sensor circuit 100 in FIG. 3 includes the semiconductor element 101, the semiconductor element 102, the constant current circuit 103, the constant current circuit 104, and the amplifier circuit 105. Further, the temperature sensor circuit 100 in FIG. 3 includes an analog-digital convertor (ADC) circuit 106, arithmetic circuit 107, and a lookup table (LUT) 108.

The output voltage Vout output from the amplifier circuit 105 varies with continuous change over time of the temperature of an object to be detected. The ADC 106 has a function of obtaining and holding the output voltage Vout in a predetermined period, that is, a function of performing sampling. In addition, the ADC 106 has a function of performing analog-digital conversion of a sampled value of the output voltage Vout.

The LUT 108 stores collected data where the digital value of the Vout obtained by conversion in the ADC 106 is linked with data of the temperature of an object to be detected. The arithmetic circuit 107 has a function of generating a signal containing data of the temperature of an object to be detected by arithmetic processing in accordance with the specifications of a circuit or a device in the next stage of the temperature sensor circuit 100; for the arithmetic processing, the digital value of the voltage Vout obtained by conversion in the data stored in the LUT 108 is used. The voltage of the signal is output from the output terminal 109.

The temperature sensor circuit 100 of one embodiment of the present invention may further include a memory device for storing other data used for arithmetic processing in the arithmetic circuit 107, a buffer memory device for temporarily storing data in the arithmetic processing, or the like.

The temperature sensor circuit 100 of one embodiment of the present invention may further include a circuit which performs signal processing on the voltage Vout. Examples of the circuit are a filter circuit and a linearization circuit. The filter circuit has a function of removing noise from the voltage Vout. The linearization circuit has a function of correcting the voltage Vout so that the value of the voltage Vout and the physical value of an object to be detected have a linear relation.

The temperature sensor circuit 100 of one embodiment of the present invention may further include a current setting circuit which has a function of correcting the difference between current values output from the constant current circuit 103 and the constant current circuit 104 due to a difference in influence of temperature or a difference in electrical characteristics of transistors.

Figure 5A:
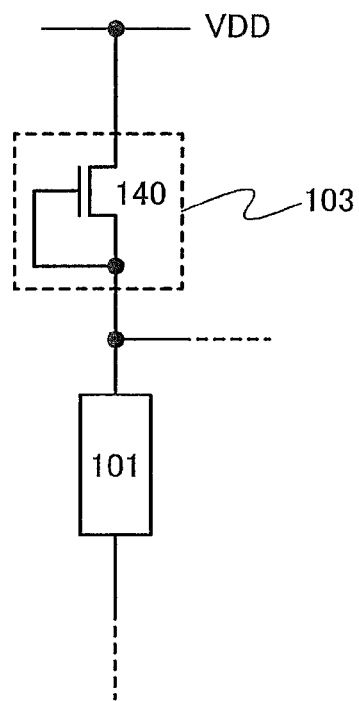
FIGS. 5A and 5B each illustrate the configuration of a constant current circuit.
Figure 5B:
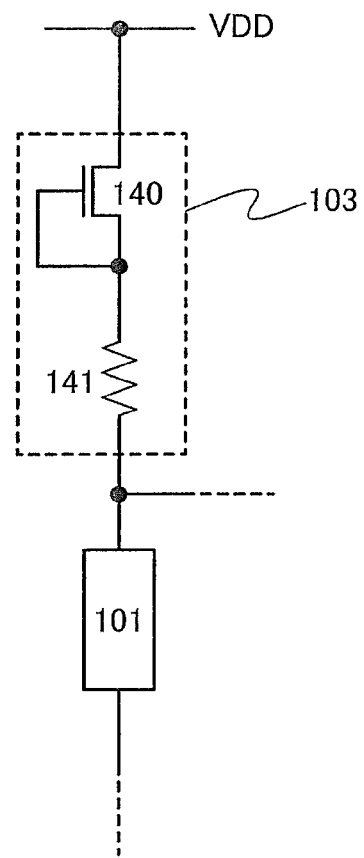

Next, specific configuration examples of the constant current circuit 103 and the constant current circuit 104 will be described. FIGS. 5A and 5B illustrate configuration examples of the constant current circuit 103. Note that the constant current circuit 104 may have the same configuration as the constant current circuit 103 illustrated in FIGS. 5A and 5B.

The constant current circuit 103 illustrated in FIG. 5A includes an n-channel transistor 140. One of a source terminal and a drain terminal of the transistor 140 is connected to a node supplied with the potential VDD, and a gate electrode and the other of the source terminal and the drain terminal of the transistor 140 is connected to a second terminal of the semiconductor element 101.

The constant current circuit 103 in FIG. 5B includes the n-channel transistor 140 and a resistor 141. One of a source terminal and a drain terminal of the transistor 140 is connected to a node supplied with the potential VDD, and a gate electrode and the other of the source terminal and the drain terminal of the transistor 140 is connected to one terminal of the resistor 141. The other terminal of the resistor 141 is connected to a second terminal of the semiconductor element 101.

Figure 4:
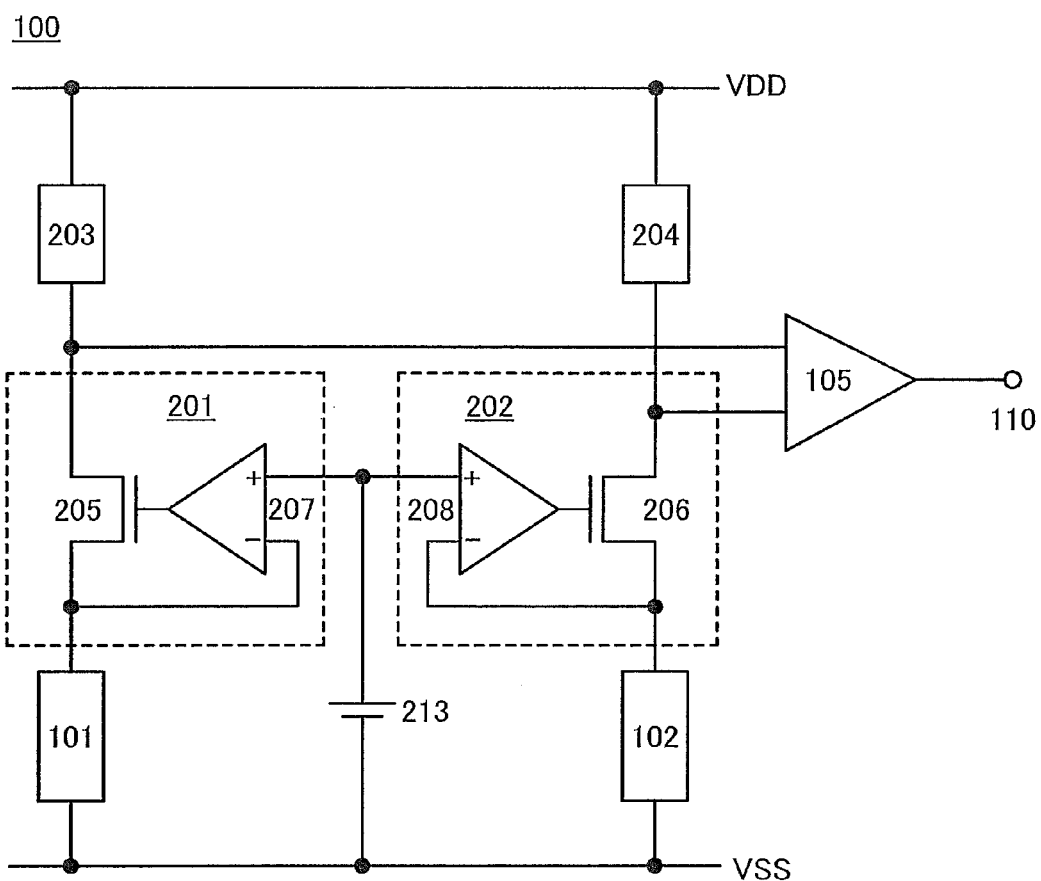
FIG. 4 illustrates the configuration of a temperature sensor circuit.

Next, FIG. 4 illustrates another configuration example of the temperature sensor circuit of one embodiment of the present invention. The temperature sensor circuit 100 in FIG. 4 includes the semiconductor element 101, the semiconductor element 102, and the amplifier circuit 105 like the temperature sensor circuit 100 in FIG. 1. The temperature sensor circuit 100 in FIG. 4 further includes a constant voltage circuit 201, a constant voltage circuit 202, a load 203, a load 204, and a voltage source 213.

The constant voltage circuit 201 is connected between a second terminal of the semiconductor element 101 and a node supplied with the potential VDD. The constant voltage circuit 202 is connected between a second terminal of the semiconductor element 102 and the node supplied with the potential VDD.

Specifically, the constant voltage circuit 201 includes an n-channel transistor 205 and a differential amplifier circuit 207. The load 203 is connected between the node supplied with the high-level potential VDD and one of a source terminal and a drain terminal of the transistor 205. The second terminal of the semiconductor element 101 is connected to the other of the source terminal and the drain terminal of the transistor 205, and a first terminal of the semiconductor element 101 is connected to a node supplied with the low-level potential VSS. An inverting input terminal (−) of the differential amplifier circuit 207 is connected to the second terminal of semiconductor element 101, a non-inverting input terminal (+) of the differential amplifier circuit 207 is connected to the voltage source 213, and an output terminal of the differential amplifier circuit 207 is connected to a gate electrode of the transistor 205.

The constant voltage circuit 201 having the above configuration supplies a voltage substantially equal to the voltage output from the voltage source 213, between the first terminal and the second terminal of the semiconductor element 101. When a current flowing through the semiconductor element 101 flows to the load 203 through the transistor 205, a voltage is generated between terminals of the load 203. The voltage generated between the terminals of the load 203 reflects a current flowing through the semiconductor element 101.

Further, specifically, the constant voltage circuit 202 includes an n-channel transistor 206 and a differential amplifier circuit 208. The load 204 is connected between the node supplied with the high-level potential VDD and one of a source terminal and a drain terminal of the transistor 206. The second terminal of the semiconductor element 102 is connected to the other of the source terminal and the drain terminal of the transistor 206, and a first terminal of the semiconductor element 102 is connected to the node supplied with the low-level potential VSS. An inverting input terminal (−) of the differential amplifier circuit 208 is connected to the second terminal of semiconductor element 102, a non-inverting input terminal (+) of the differential amplifier circuit 208 is connected to the voltage source 213, and an output terminal of the differential amplifier circuit 208 is connected to a gate electrode of the transistor 206.

The constant voltage circuit 202 having the above configuration supplies a voltage substantially equal to the voltage output from the voltage source 213, between the first terminal and the second terminal of the semiconductor element 102. When a current flowing through the semiconductor element 102 flows to the load 204 through the transistor 206, a voltage is generated between terminals of the load 204. The voltage generated between the terminals of the load 204 reflects a current flowing through the semiconductor element 102.

The amplifier circuit 105 has a function of amplifying a voltage difference between the voltage generated between the terminals of the load 203 and the voltage generated between the terminals of the load 204 and outputting the amplified voltage difference as the voltage Vout from the output terminal 110 of the amplifier circuit 105. Specifically, in the temperature sensor circuit 100 illustrated in FIG. 4, the potential obtained by subtracting the voltage generated between the terminals of the load 203 from the potential VDD and the potential obtained by subtracting the voltage generated between the terminals of the load 204 from the potential VDD are supplied to the amplifier circuit 105.

Note that the voltage generated between the terminals of the load 204 contains, as data, a variation with temperature in a voltage applied from the constant voltage circuit 202, a variation in electrical characteristics of a transistor included in the constant voltage circuit 202, and the like besides the temperature of the semiconductor element 102. The voltage generated between the terminals of the load 203 presumably does not contain data of the temperature of the semiconductor element 101 but contains a variation with temperature in a voltage applied from the constant voltage circuit 201, variations in the electrical characteristics of a transistor included in the constant current circuit 201, and the like as data. Thus, assuming that there is no difference in influence of temperature, the electrical characteristics of the transistors, and the like between the constant current circuit 201 and the constant current circuit 202, the differences between the constant current circuit 201 and the constant current circuit 202 in influence of temperature, the electrical characteristics of the transistors, and the like are canceled in the voltage Vout obtained when the amplifier circuit 105 amplifies the voltage difference between the voltage generated between the terminals of the load 203 and the voltage generated between the terminals of the load 204. Thus, in the temperature sensor circuit 100 of one embodiment of the present invention, a factor which affects the voltage generated between the terminals of the load 204 and which is other than the temperature of an object to be detected can be prevented from influencing a measurement value the voltage Vout, so that more accurate data of the temperature of the detected object can be obtained; the factor is, for example, a variation with temperature in a voltage applied from the constant voltage circuit 202 to the semiconductor element 102 or variations in the electrical characteristics of the transistor included in the constant current circuit 202.

Note that the voltage applied to the semiconductor element 101 does not necessarily have to be equal to the voltage applied to the semiconductor element 102. However, when the voltages are equal to or substantially equal to each other, differences between the constant current circuit 201 and the constant current circuit 202 in influence of temperature, the electrical characteristics of the transistors, and the like can be cancelled more accurately.

As the load 203 or the load 204, for example, a resistor can be used. As the voltage source 213, for example, a zener diode can be used.

The temperature sensor circuit 100 of one embodiment of the present invention does not necessarily have to include the voltage source 213 unlike in FIG. 4 and the voltage source 213 may be provided outside the temperature sensor circuit 100.

The temperature sensor circuit 100 in FIG. 4 may further include the ADC 106, the arithmetic circuit 107, and the LUT 108 included in the temperature sensor circuit 100 in FIG. 3. The temperature sensor circuit 100 in FIG. 4 may further include a filter circuit, a linearization circuit, or the like.

(Embodiment 2)

Figure 6:
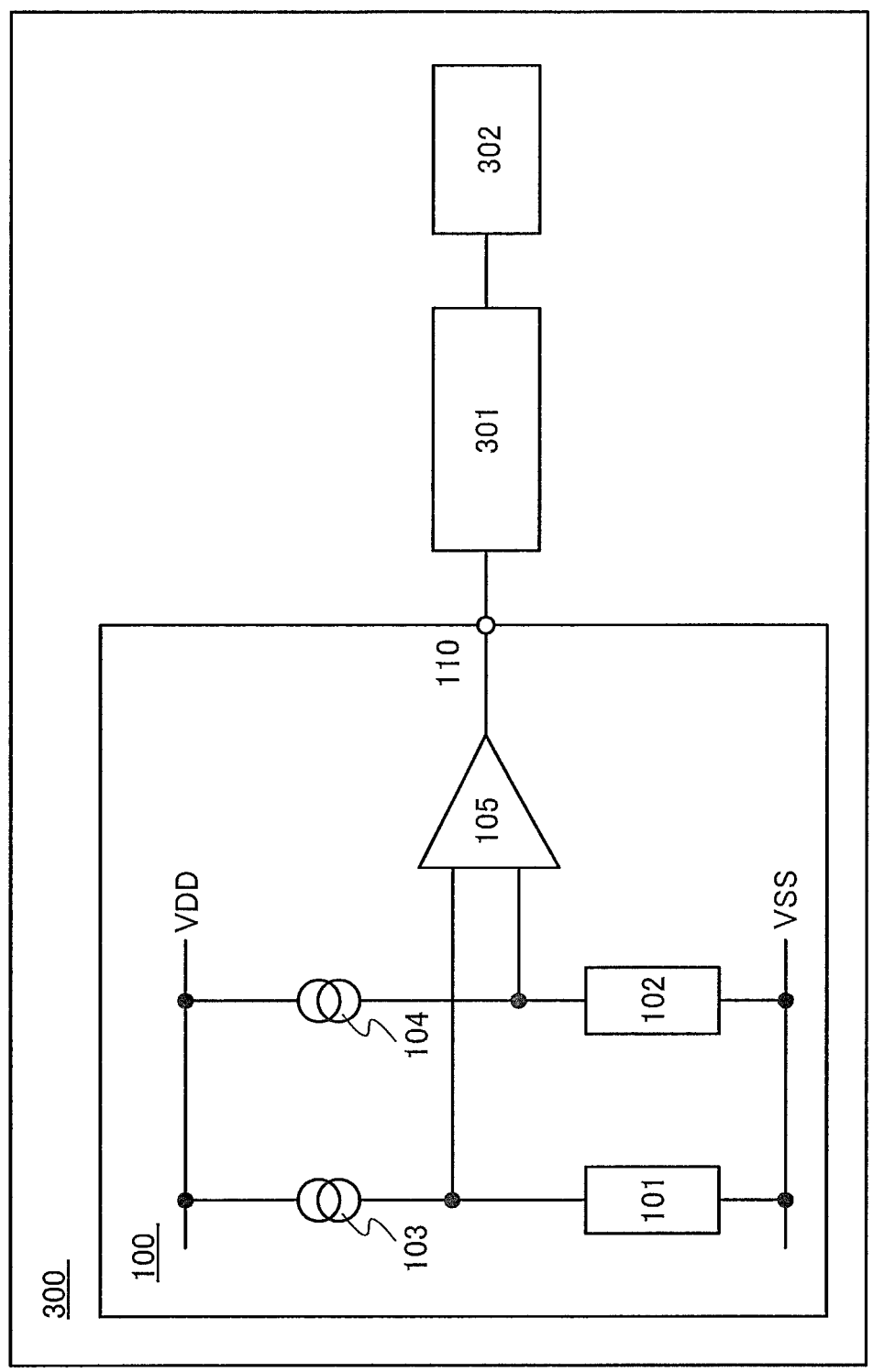
FIG. 6 illustrates the configuration of a semiconductor device

FIG. 6 is an example of a block diagram illustrating the configuration of a semiconductor device 300 of one embodiment of the present invention. The semiconductor device 300 illustrated in FIG. 6 includes the temperature sensor circuit 100, a signal processing circuit 301, and an output device 302. Although FIG. 6 illustrates an example of the configuration of the semiconductor device including the temperature sensor circuit 100 illustrated in FIG. 1, the semiconductor device of one embodiment of the present invention may include any of the temperature sensor circuits 100 illustrated in FIG. 2A, FIG. 3, and FIG. 4.

A sensor signal output from the temperature sensor circuit 100 is input to the signal processing circuit 301. By using the sensor signal, the signal processing circuit 301 generates a signal for controlling the operation of the output device 302. Specifically, the signal includes the following: a signal for outputting temperature data which is included in the sensor signal to the output device 302, a signal for changing the operation of the output device 302 in accordance with the temperature data which is included as data in the sensor signal, or the like.

Specific examples of the output device 302 are a display device, a printer, a plotter, and an audio output device. For example, in the case of using a display device as the output device 302, the temperature data can be displayed on the display device. Further, in the case of using a display device as the output device 302, the temperature data can be used to control the luminance or contrast of the display device so that the luminance or contrast of the display device is not changed with the temperature.

A specific configuration example of the semiconductor device 300 of one embodiment of the present invention will be described with reference to FIG. 7.

In a liquid crystal display device, the optical property of a liquid crystal material used for a liquid crystal layer, specifically, the transmittance thereof with respect to an applied voltage varies with temperature in some cases. In the semiconductor device 300 illustrated in FIG. 7, the temperature sensor circuit 100 measures the temperature of a liquid crystal layer which is an object to be detected, and an application voltage to a liquid crystal element is controlled in accordance with the temperature in a liquid crystal display device serving as the output device 302, whereby a change in contrast due to a temperature change can be prevented.

Figure 7:
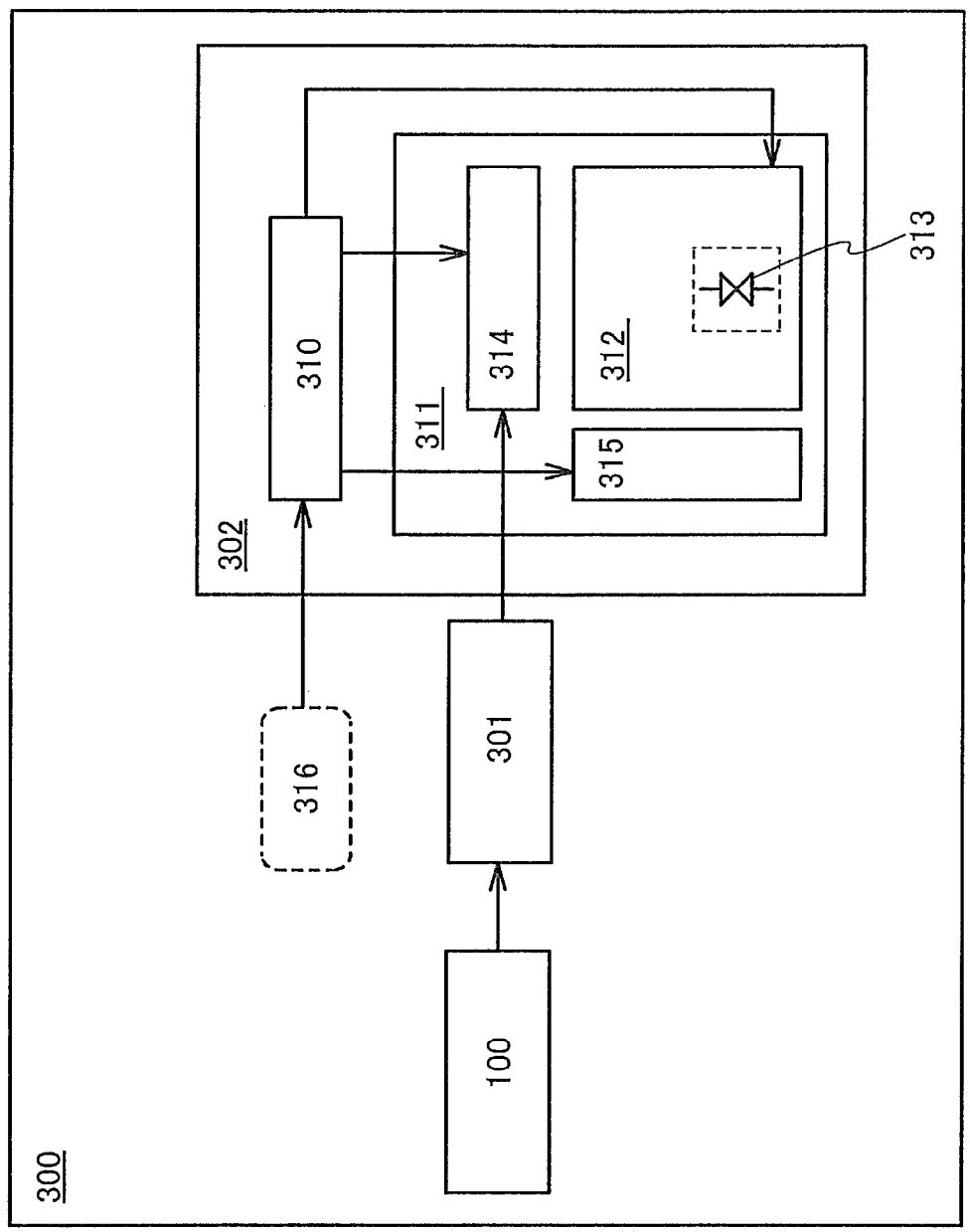
FIG. 7 illustrates the configuration of a semiconductor device.

Specifically, the semiconductor device 300 illustrated in FIG. 7 includes, like the semiconductor device 300 illustrated in FIG. 6, the temperature sensor circuit 100, the signal processing circuit 301, and the output device 302. Further, in FIG. 7, the output device 302 includes a controller 310 and a panel 311. The panel 311 includes a pixel portion 312 provided with a liquid crystal element 313 in each pixel, and a driver circuit 314 and a driver circuit 315 which control the operation of the pixel portion 312. The liquid crystal element 313 includes a pixel electrode whose potential is controlled by an image signal, a common electrode to which a predetermined reference potential is supplied, and a liquid crystal layer to which a voltage is applied from the pixel electrode and the common electrode.

A sensor signal containing data of the temperature of the liquid crystal element 313 is input from the temperature sensor circuit 100 to the signal processing circuit 301. In accordance with the sensor signal containing the temperature data, the signal processing circuit 301 generates a signal for controlling the transmittance of the liquid crystal element 313. In the output device 302, the controller 310 controls, for example, a reference potential supplied to the common electrode in accordance with the signal for controlling the transmittance of the liquid crystal element 313, so as to control an application voltage to the liquid crystal element 313.

The controller 310 has a function of processing an image signal 316 and supplying the image signal 316 to the driver circuit 314 or the driver circuit 315, or a function of generating a driving signal for controlling the operation of the driver circuit 314 and the driver circuit 315 and supplying the driving signal to the driver circuit 314 and the driver circuit 315.

This embodiment can be implemented in combination with any of the other embodiments, as appropriate.

(Embodiment 3)

A configuration example of a transistor where an oxide semiconductor is used for an active layer will be described.

Figure 8A:
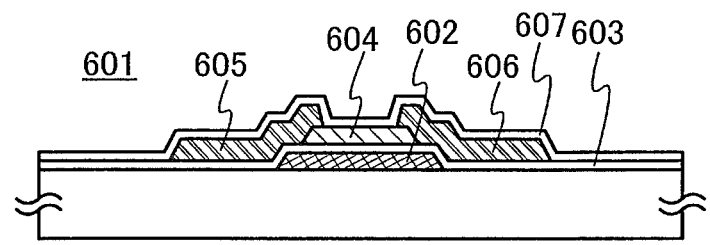
FIGS. 8A to 8D are each a cross-sectional view of a transistor.

A transistor 601 illustrated in FIG. 8A is a channel-etched, bottom-gate transistor.

The transistor 601 includes a gate electrode 602 formed over an insulating surface, a gate insulating film 603 over the gate electrode 602, an oxide semiconductor film 604 serving as an active layer which overlaps with the gate electrode 602 with the gate insulating film 603 interposed therebetween, and a conductive film 605 and a conductive film 606 formed over the oxide semiconductor film 604. The transistor 601 may further include an insulating film 607 formed over the oxide semiconductor film 604, the conductive film 605, and the conductive film 606.

Note that the transistor 601 illustrated in FIG. 8A may further include a gate electrode which overlaps with the oxide semiconductor film 604 and is over the insulating film 607.

Figure 8B:
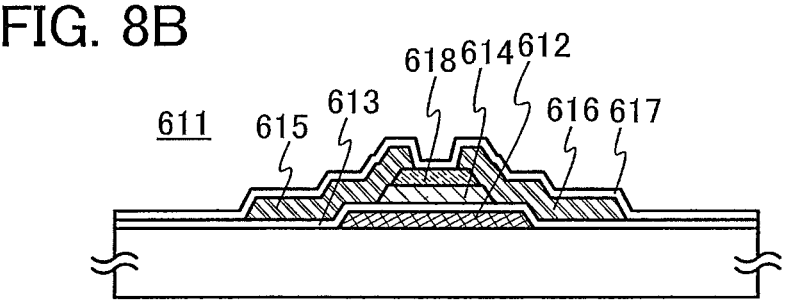

A transistor 611 illustrated in FIG. 8B is a channel-protective, bottom-gate transistor.

The transistor 611 includes a gate electrode 612 formed over an insulating surface, a gate insulating film 613 over the gate electrode 612, an oxide semiconductor film 614 which overlaps with the gate electrode 612 with the gate insulating film 613 interposed therebetween and serves as an active layer, a channel protective film 618 formed over the oxide semiconductor film 614, and a conductive film 615 and a conductive film 616 formed over the oxide semiconductor film 614. The transistor 611 may further include an insulating film 617 formed over the channel protective film 618, the conductive film 615, and the conductive film 616.

Note that the transistor 611 illustrated in FIG. 8B may further include a gate electrode which overlaps with the oxide semiconductor film 614 and is over the insulating film 617.

The channel protective film 618 can prevent a portion of the oxide semiconductor film 614 which serves as a channel formation region from being damaged in a later step (for example, a reduction in thickness due to plasma or an etchant in etching). Accordingly, reliability of the transistor 611 can be improved.

Figure 8C:
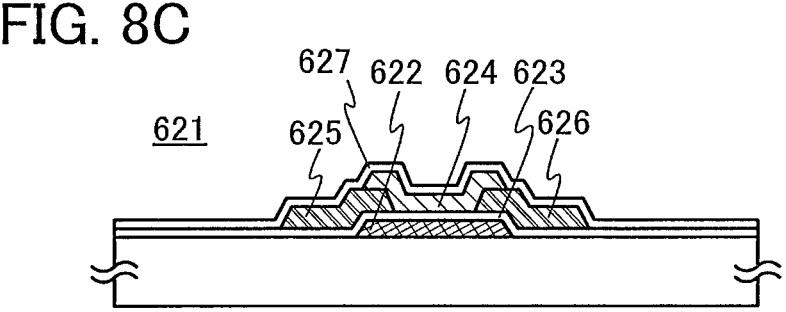

A transistor 621 illustrated in FIG. 8C is a bottom-contact, bottom-gate transistor.

The transistor 621 includes a gate electrode 622 formed over an insulating surface, a gate insulating film 623 over the gate electrode 622, a conductive film 625 and a conductive film 626 formed over the gate insulating film 623, and an oxide semiconductor film 624 which overlaps with the gate electrode 622 with the gate insulating film 623 interposed therebetween and is over the conductive films 625 and 626 and serves as an active layer. The transistor 621 may further include an insulating film 627 formed over the conductive film 625, the conductive film 626, and the oxide semiconductor film 624.

Note that the transistor 621 illustrated in FIG. 8C may further include a gate electrode which overlaps with the oxide semiconductor film 624 with the insulating film 627 interposed therebetween.

Figure 8D:
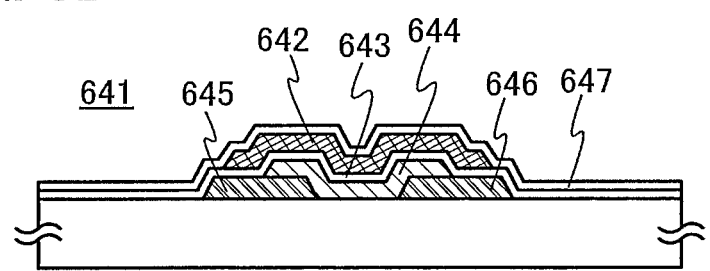

A transistor 641 illustrated in FIG. 8D is a bottom-contact, top-gate transistor.

The transistor 641 includes a conductive film 645 and a conductive film 646 formed over an insulating surface, an oxide semiconductor film 644 which is formed over the conductive films 645 and 646 and serves as an active layer, a gate insulating film 643 formed over the oxide semiconductor film 644 and the conductive films 645 and 646, and a gate electrode 642 which overlaps with the oxide semiconductor film 644 with the gate insulating film 643 interposed therebetween. The transistor 641 may further include an insulating film 647 formed over the gate electrode 642.

This embodiment can be implemented in combination with any of the other embodiments, as appropriate.

(Embodiment 4)

Figure 9:
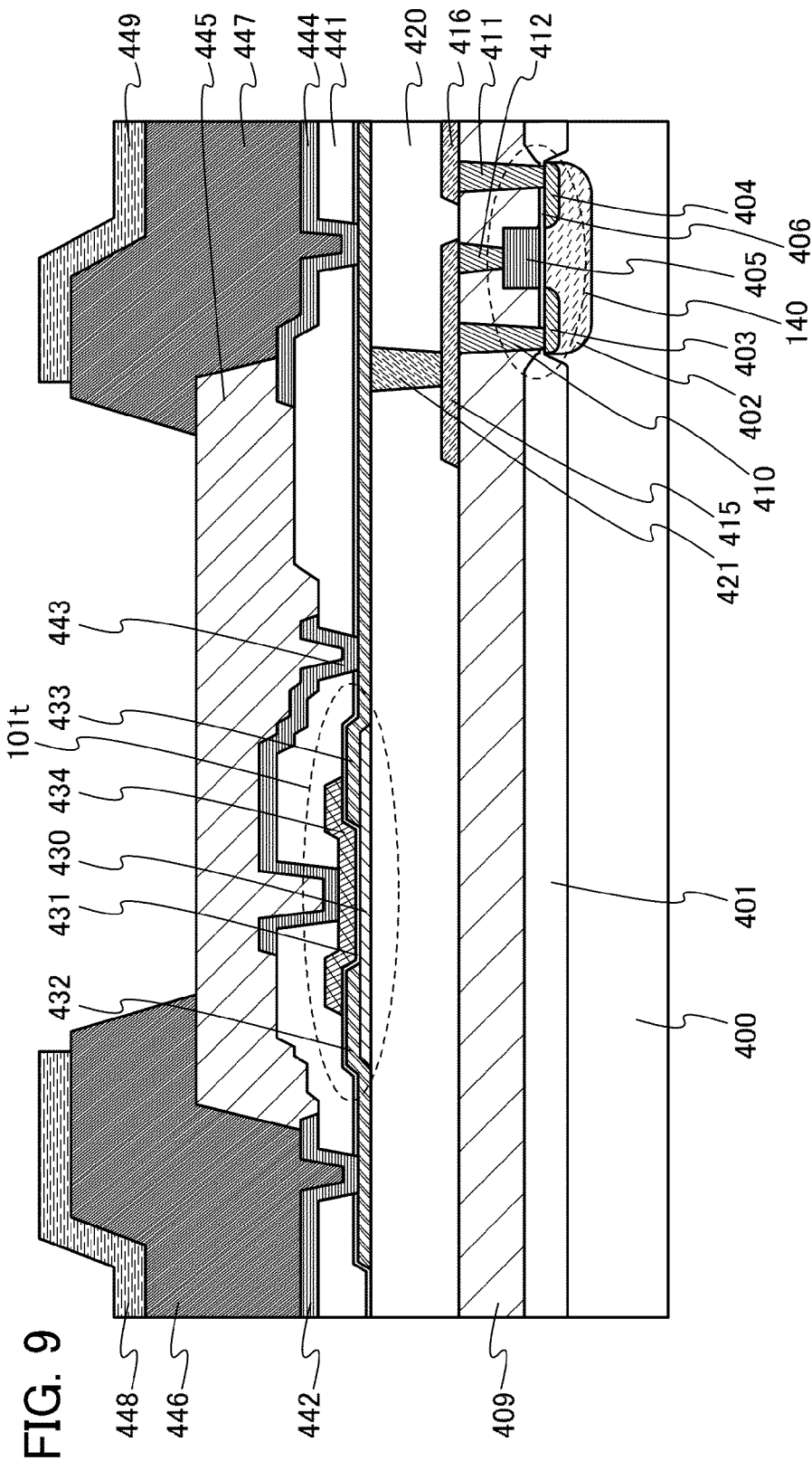
FIG. 9 is a cross-sectional view of a temperature sensor circuit.

FIG. 9 illustrates an example of part of a cross-sectional structure of a temperature sensor circuit of one embodiment of the present invention. Note that FIG. 9 illustrates the case where the transistor 101*t* included in the temperature sensor circuit 100 illustrated in FIG. 2A and the transistor 140 included in the constant current circuit 103 illustrated in FIG. 5A are stacked.

In this embodiment, described is the case where the transistor 140 is formed over a single crystal silicon substrate and the transistor 101*t* where an oxide semiconductor is used for an active layer is formed over the transistor 140. In the transistor 140, a semiconductor thin film of silicon, germanium, or the like in an amorphous, microcrystalline, polycrystalline, or signal crystal state may be used for the active layer.

In the case where the transistor 140 is formed using a thin silicon film, any of the following can be used: amorphous silicon formed by a vapor phase growth method such as a plasma CVD method, or a sputtering method; polycrystalline silicon obtained in such a manner that amorphous silicon is crystallized by treatment such as laser annealing; single crystal silicon obtained in such a manner that implantation of hydrogen ions or the like into a single crystal silicon wafer is performed and a surface portion of the single crystal silicon wafer is separated; and the like.

In FIG. 9, the semiconductor substrate 400 is provided with the n-channel transistor 140.

The semiconductor substrate 400 can be, for example, a single crystal silicon substrate having n-type or p-type conductivity, a compound semiconductor substrate (e.g., a GaAs substrate, an InP substrate, a GaN substrate, a SiC substrate, a GaP substrate, a GaInAsP substrate, or a ZnSe substrate), or the like. FIG. 9 illustrates an example where a single crystal silicon substrate having n-type conductivity is used.

The transistor 140 is electrically isolated from other semiconductor elements such as transistors by an element isolation insulating film 401. The element isolation insulating film 401 can be formed by a local oxidation of silicon (LOCOS) method, a trench isolation method, or the like.

In a region where the n-channel transistor 140 is formed, a p-well 402 is formed by selective introduction of an impurity element imparting p-type conductivity. In the case where a p-channel transistor is formed using a semiconductor substrate having p-type conductivity, an impurity element imparting n-type conductivity is selectively introduced to a region where the p-channel transistor is formed, so that a region called an n-well is formed.

Specifically, the transistor 140 includes impurity regions 403 and 404 which are formed in the semiconductor substrate 400 and function as source and drain regions, a gate electrode 405, and a gate insulating film 406 sandwiched between the semiconductor substrate 400 and the gate electrode 405. The gate electrode 405 overlaps with a channel formation region formed between the impurity regions 403 and 404, with the gate insulating film 406 interposed therebetween.

An insulating film 409 is provided over the transistor 140. Openings are formed in the insulating film 409, and wirings 410, 411, and 412 that are in contact with the impurity region 403, the impurity region 404, and the impurity region 405, respectively, are formed in the openings.

Further, the wirings 410 and 412 are connected to a wiring 415 formed over the insulating film 409, and the wiring 411 is connected to a wiring 416 formed over the insulating film 409.

An insulating film 420 is formed over the wirings 415 and 416. An opening is formed to penetrate the insulating film 420, and a wiring 421 connected to the wiring 415 is formed in the opening.

Further, in FIG. 9, the transistor 101*t* is formed over the insulating film 420.

The transistor 101*t* includes, over the insulating film 420, a semiconductor film 430 including an oxide semiconductor;

conductive films 432 and 433 that are provided over the semiconductor film 430 and function as source and drain electrodes; a gate insulating film 431 over the semiconductor film 430 and the conductive films 432 and 433; and a gate electrode 434 that overlaps with the semiconductor film 430 in a region between the conductive films 432 and 433, with the gate insulating film 431 interposed between the gate electrode 434 and the semiconductor film 430.

The conductive film 433 is in contact with the wiring 421.

An insulating film 441 is provided over the transistor 101t. Openings are formed in the insulating film 441 and the gate insulating film 431, and a conductive film 442 in contact with the conductive film 432 in the opening, a conductive film 443 in contact with the gate electrode 434 and the conductive film 433 in the opening, and a conductive film 444 in contact with the conductive film 433 in the opening are provided.

Further, an insulating film 445 is provided over the insulating film 441 and conductive films 442 to 444. Openings are formed in the insulating film 445, and a conductive film 446 that is in contact with the conductive film 442 in the opening and a conductive film 447 that is in contact with the conductive film 444 in the opening are provided. The conductive films 446 and 447 preferably have high surface flatness in order to be connected to an input terminal or a power source of an amplifier circuit later. Thus, a resin in which conductive particles are dispersed is suitable as a material of the conductive films 446 and 447. Note that since a resin has low adhesion to a solder, a conductive film 448 is formed using a conductive material having high adhesion to a solder to be in contact with the conductive film 446, and a conductive film 449 is formed using a conductive material having high adhesion to a solder to be in contact with the conductive film 447.

This embodiment can be implemented in combination with any of the other embodiments, as appropriate.

This application is based on Japanese Patent Application serial no. 2012-105460 filed with the Japan Patent Office on May 2, 2012, the entire contents of which are hereby incorporated by reference.

What is claimed is:

1. A temperature sensor circuit comprising:
a first constant current circuit;
a first semiconductor element where a first voltage is generated between a pair of terminals in accordance with a first current supplied from the first constant current circuit;
a second constant current circuit;
a second semiconductor element where a second voltage is generated between a pair of terminals in accordance with a second current supplied from the second constant current circuit; and
an amplifier circuit which amplifies a difference between the first voltage and the second voltage,
wherein a rate of change in the first voltage with a first temperature of the first semiconductor element is greater than a rate of change in the second voltage with a second temperature of the second semiconductor element,
wherein a value of the first temperature is the same as a value of the second temperature,
wherein the second semiconductor element comprises an oxide semiconductor, and
wherein the first semiconductor element comprises a semiconductor other than the oxide semiconductor.

2. The temperature sensor circuit according to claim 1 wherein the oxide semiconductor comprises In, Ga, and Zn.

3. The temperature sensor circuit according to claim 1, wherein at least one of the first semiconductor element and the second semiconductor element is a diode.

4. The temperature sensor circuit according to claim 1, wherein a value of the first current is equal to a value of the second current.

5. A semiconductor device comprising:
a temperature sensor circuit which generates a signal;
an output device; and
a signal processing circuit which controls operation of the output device using the signal,
wherein the temperature sensor circuit comprises:
a first constant current circuit;
a first semiconductor element where a first voltage is generated between a pair of terminals in accordance with a first current supplied from the first constant current circuit;
a second constant current circuit;
a second semiconductor element where a second voltage is generated between a pair of terminals in accordance with a second current supplied from the second constant current circuit; and
an amplifier circuit which amplifies a difference between the first voltage and the second voltage and generates the signal, and
wherein a rate of change in the first voltage with a first temperature of the first semiconductor element is greater than a rate of change in the second voltage with a second temperature of the second semiconductor element,
wherein a value of the first temperature is the same as a value of the second temperature,
wherein the second semiconductor element comprises an oxide semiconductor, and
wherein the first semiconductor element comprises a semiconductor other than the oxide semiconductor.

6. The semiconductor device according to claim 5, wherein the output device is a liquid crystal display device.

7. The semiconductor device according to claim 6, wherein each pixel of the liquid crystal display device includes a liquid crystal element, and
wherein the temperature depends on a temperature of a liquid crystal layer included in the liquid crystal element.

8. The semiconductor device according to claim 7, wherein the signal processing circuit is configured to adjust a voltage applied to the liquid crystal element using the signal to control operation of the output device.

9. The semiconductor device according to claim 5, wherein the oxide semiconductor comprises In, Ga, and Zn.

10. The semiconductor device according to claim 5, wherein at least one of the first semiconductor element and the second semiconductor element is a diode.

* * * * *